(12) United States Patent
Lim et al.

(10) Patent No.: US 12,068,812 B2
(45) Date of Patent: Aug. 20, 2024

(54) METHOD AND APPARATUS FOR PERFORMING SENSING IN WIRELESS LAN SYSTEM

(71) Applicant: LG ELECTRONICS INC., Seoul (KR)

(72) Inventors: Dongguk Lim, Seoul (KR); Jinsoo Choi, Seoul (KR); Insun Jang, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/924,628

(22) PCT Filed: May 21, 2021

(86) PCT No.: PCT/KR2021/006346
§ 371 (c)(1),
(2) Date: Nov. 10, 2022

(87) PCT Pub. No.: WO2021/246691
PCT Pub. Date: Dec. 9, 2021

(65) Prior Publication Data
US 2023/0198579 A1 Jun. 22, 2023

(30) Foreign Application Priority Data
Jun. 2, 2020 (KR) .................. 10-2020-0066587

(51) Int. Cl.
*H04B 7/0452* (2017.01)
*H04L 27/26* (2006.01)
*H04W 24/08* (2009.01)

(52) U.S. Cl.
CPC ....... *H04B 7/0452* (2013.01); *H04L 27/2602* (2013.01); *H04W 24/08* (2013.01)

(58) Field of Classification Search
CPC ............. H04B 7/0452; H04L 27/2602; H04L 27/2613; H04L 1/0026; H04W 24/08;
(Continued)

(56) References Cited

U.S. PATENT DOCUMENTS

2016/0366701 A1* 12/2016 Chu .................... H04W 74/004
2017/0231008 A1* 8/2017 Ahn .................... H04W 74/006
2017/0251332 A1* 8/2017 Aldana ................... G01S 5/021

FOREIGN PATENT DOCUMENTS

KR 10-2015-0065140 A 6/2015
KR 10-2016-0045025 A 4/2016

OTHER PUBLICATIONS

Cheng Chen et al., "WLAN Sensing Definitions", IEEE 802.11-20/0807r0, May 25, 2020, see slides 3-8.
(Continued)

*Primary Examiner* — Sung S Ahn
(74) *Attorney, Agent, or Firm* — BRYAN CAVE LEIGHTON PAISNER LLP

(57) ABSTRACT

Proposed are a method and apparatus for performing sensing in a wireless LAN system. In detail, a transmission STA transmits a first trigger frame that requests sensing from a reception STA. The transmission STA receives a response frame to the first trigger frame from the reception STA. The transmission STA transmits a second trigger frame that requests a first sensing frame from the reception STA. The transmission STA receives the first sensing frame from the reception STA. The transmission STA performs channel measurement on the basis of the first sensing frame and obtains sensing information.

15 Claims, 18 Drawing Sheets

(58) Field of Classification Search
CPC ... H04W 72/542; H04W 72/40; H04W 84/12; G01S 13/04; G01S 13/56; G01S 7/006
See application file for complete search history.

(56) References Cited

OTHER PUBLICATIONS

Yasaman Ghasempour et al., "IEEE 802.11ay: Next-Generation 60 GHz Communication for 100 GB/s Wi-Fi", IEEE Communications Magazine (vol. 55, Issue:12, Dec. 2017), Oct. 27, 2017, see pp. 186-189; and figures 1-2.
Alecsander Eitan et al., "EDMG Header-A Fields preview in L-Header", IEEE 802.11-16/1395-01-00, Nov. 10, 2016, see slides 2-5.

* cited by examiner

FIG. 8

| L-STF | L-CEF | L-Header | EDMG-Header-A | EDMG-STF | EDMG-CEF |

FIG. 9

| L-STF | L-CEF | L-Header | EDMG-Header-A | EDMG-CEF |

FIG. 10

| L-STF | L-CEF | L-Header | EDMG-Header-A | EDMG-STF | EDMG-CEF | TRN |

FIG. 11

| L-STF | L-CEF | L-Header | EDMG-Header-A | EDMG-STF | TRN |

METHOD AND APPARATUS FOR PERFORMING SENSING IN WIRELESS LAN SYSTEM

CROSS REFERENCE TO RELATED APPLICATIONS

This application is the National Stage filing under 35 U.S.C. 371 of International Application No. PCT/KR2021/006346, filed on May 21, 2021, which claims the benefit of and priority to Korean Patent Application No. 10-2020-0066587, filed on Jun. 2, 2020, the contents of which are all hereby incorporated by reference herein in their entirety.

TECHNICAL FIELD

The present specification relates to a technique for performing sensing in a wireless LAN system, and more particularly, to a method and an apparatus for configuring a sensing frame for channel measurement in a 60 MHz band.

BACKGROUND

A wireless local area network (WLAN) has been improved in various ways. For example, IEEE 802.11bf wireless LAN sensing is the first standard that converges communications and radar technologies. Although the demand for unlicensed spectrum is rapidly increasing in everyday life and industry, there is a limit to the new spectrum supply. Therefore, the development of convergence technology between communication and radar is a very desirable direction in terms of increasing frequency utilization efficiency. Sensing technology that detects movement behind a wall using a wireless LAN signal or a radar technology that detects movement in a vehicle using a Frequency Modulated Continuous Wave (FMCW) signal in the 70 GHz band is being developed. It can be of great significance in that it can raise the sensing performance to one level by linking it. In particular, as the importance of privacy protection is increasingly emphasized in modern society, the development of wireless LAN sensing technology that is legally free from the issue of privacy infringement is more expected than CCTV.

Meanwhile, the overall radar market across automobiles, defense, industry, and life is expected to grow at a compound annual growth rate (CAGR) of about 5% by 2025, and in particular, in the case of living sensors, the CAGR is expected to grow rapidly to 70%. Wireless LAN sensing technology can be applied to a wide range of real-life applications such as motion detection, breathing monitoring, positioning/tracking, fall detection, in-vehicle infant detection, appearance/proximity recognition, personal identification, body motion recognition, and behavior recognition, thereby promoting the growth of related new businesses and It is expected to contribute to enhancing the competitiveness of the company.

SUMMARY

The present specification proposes a method and an apparatus for performing sensing in a wireless LAN system.

An example of the present specification proposes a method for performing sensing.

This embodiment may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

This embodiment is performed in a transmitting STA, and the transmitting STA may correspond to a sensing initiator. The receiving STA of this embodiment may correspond to a sensing responder.

This embodiment proposes a sensing procedure for sensing a motion or gesture of an STA or an object using a wireless signal of a 60 GHz band. In particular, this embodiment proposes a method of configuring a sensing frame transmitted and received by the transmitting STA and the receiving STA.

A transmitting station (STA) transmits a first trigger frame requesting sensing to a receiving STA. The first trigger frame may support point to point (P2P) or point to multipoint (P2MP).

The transmitting STA receives a response frame to the first trigger frame from the receiving STA. The response frame may be a clear to send (CTS) frame.

The transmitting STA transmits a second trigger frame requesting the first sensing frame to the receiving STA.

The transmitting STA receives the first sensing frame from the receiving STA.

The transmitting STA performs channel measurement based on the first sensing frame and obtains sensing information. The transmitting STA may know a change in amplitude and phase of a channel by performing channel measurement based on the first sensing frame, and may acquire the sensing information through this.

In this case, the transmitting STA and the receiving STA transmit and receive a radio signal in a 60 GHz band. That is, it can be said that all of the above-described frames are radio signals transmitted and received in a 60 GHz band.

Using the sensing frame proposed in this specification, it satisfies coexistence with the 802.11ay system existing in the 60 GHz band. There is an effect that the movement and change of a user or object can be efficiently detected using the sensing frame in the 60 GHz band.

BRIEF DESCRIPTION OF THE DRAWINGS

FIG. 8 shows an example of a sensing frame format.

FIG. 9 shows another example of a sensing frame format.

FIG. 10 shows another example of a sensing frame format.

FIG. 11 shows another example of a sensing frame format.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features that are individually described in one drawing in this specification may be implemented individually or simultaneously.

The following examples of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may be applied to a newly proposed wireless LAN sensing standard or IEEE 802.11bf standard.

Hereinafter, technical features to which the present specification can be applied in order to describe the technical features of the present specification will be described.

Wireless LAN sensing technology is a kind of radar technology that can be implemented without standards, but it is judged that stronger performance can be obtained through standardization. The IEEE 802.11bf standard defines devices participating in WLAN sensing by function as shown in the table below. According to its function, it can be divided into a device that initiates wireless LAN sensing and a device that participates, and a device that transmits and receives a sensing PPDU (Physical Layer Protocol Data Unit).

TABLE 1

| Term | Function |
| --- | --- |
| Sensing Initiator | A device that initiates sensing |
| Sensing Responder | A device that participates in sensing |

TABLE 1-continued

| Term | Function |
| --- | --- |
| Sensing Transmitter | A device that transmits a sensing PPDU |
| Sensing Receiver | A device that receives a sensing PPDU |

Figure 1:
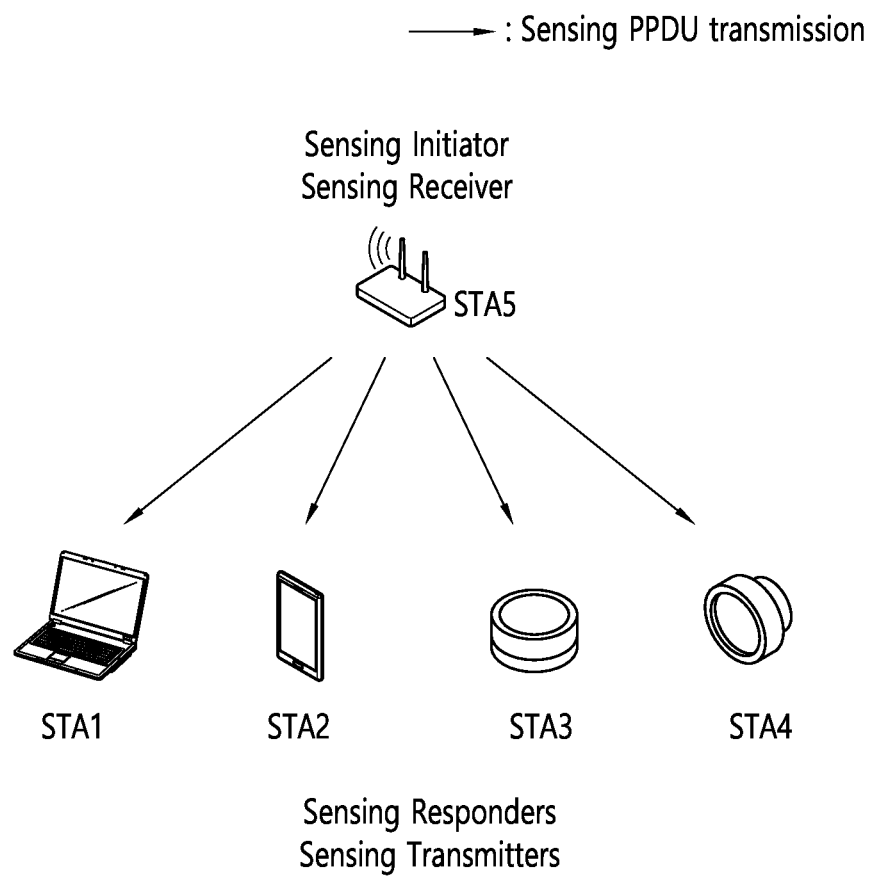
FIG. 1 shows an example of a wireless LAN sensing scenario using a multi-sensing transmitting device.

FIG. 1 shows an example of a wireless LAN sensing scenario using a multi-sensing transmitting device.

Figure 2:
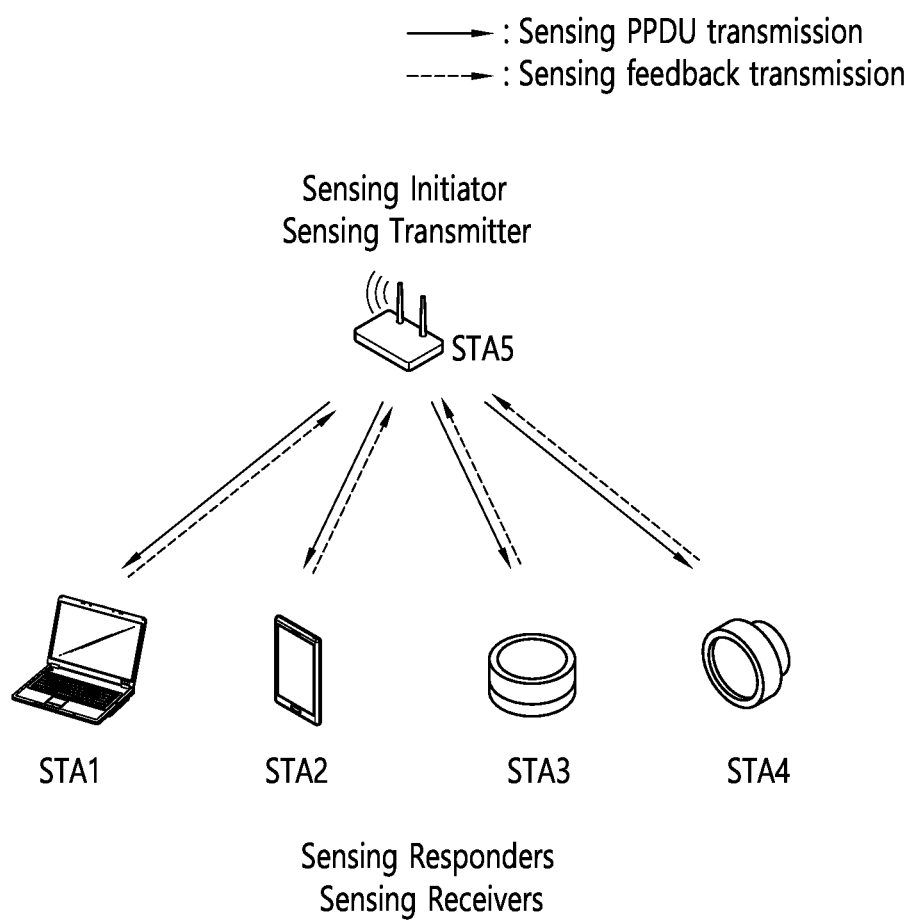
FIG. 2 shows an example of a wireless LAN sensing scenario using a multi-sensing receiving device.

FIG. 2 shows an example of a wireless LAN sensing scenario using a multi-sensing receiving device.

FIGS. 1 and 2 show sensing scenarios according to the function and arrangement of a wireless LAN sensing device. In an environment assuming one sensing start device and multiple sensing participating devices, FIG. 1 is a scenario using multiple sensing PPDU transmitting devices, and FIG. 2 is a scenario using multiple sensing PPDU receiving devices. Assuming that the sensing PPDU receiving device includes the sensing measurement signal processing device, in the case of FIG. 2, a procedure for transmitting (feedback) the sensing measurement result to the sensing initiate device (STA 5) is additionally required.

Figure 3:
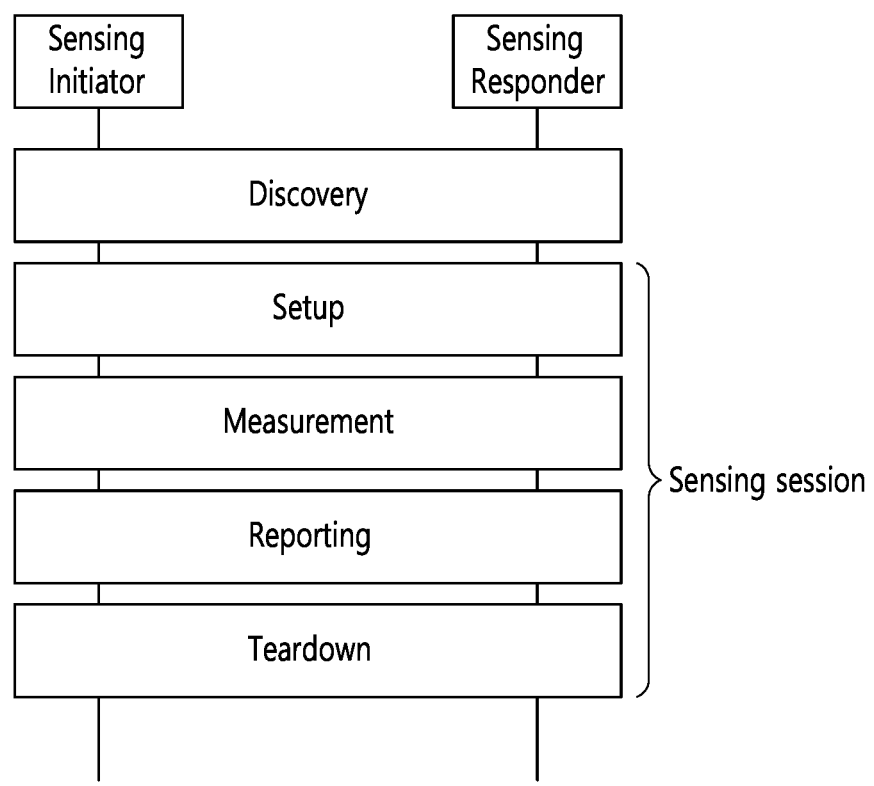
FIG. 3 shows an example of a wireless LAN sensing procedure.

FIG. 3 shows an example of a wireless LAN sensing procedure.

Looking at the procedure of wireless LAN sensing, discovery, negotiation, measurement exchange, and tear down are performed between the wireless LAN sensing initiate device and the participating device. Discovery is a process of identifying the sensing capabilities of WLAN devices, negotiation is a process of determining a sensing parameter between a sensing initiate device and a participating device, and measurement value exchange is a process of transmitting a sensing PPDU and transmitting a sensing measurement result, and connecting release is the process of terminating the sensing procedure.

Figure 4:
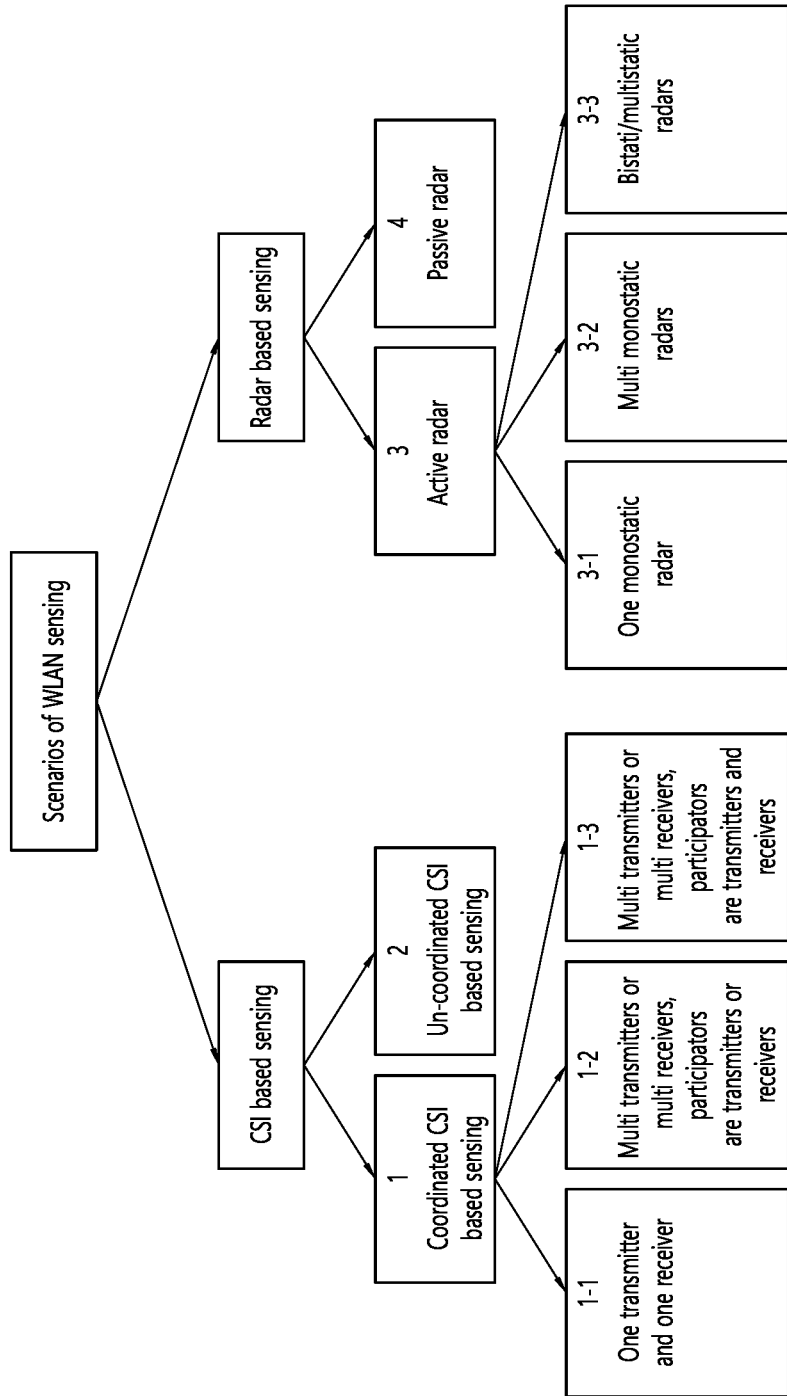
FIG. 4 is an example of classification of wireless LAN sensing.

FIG. 4 is an example of classification of wireless LAN sensing.

Wireless LAN sensing can be classified as "CSI-based sensing that uses channel state information of a signal that arrives at a receiver through a channel from a transmitter" and "Radar-based sensing that uses a signal received after a transmitted signal is reflected by an object". In addition, each sensing technology includes a method in which a sensing transmitter directly participates in the sensing process (coordinated CSI, active radar) and a method in which the sensing transmitter does not participate in the sensing process, that is, there is no dedicated transmitter participating in the sensing process (un-coordinated CSI, passive radar).

Figure 5:
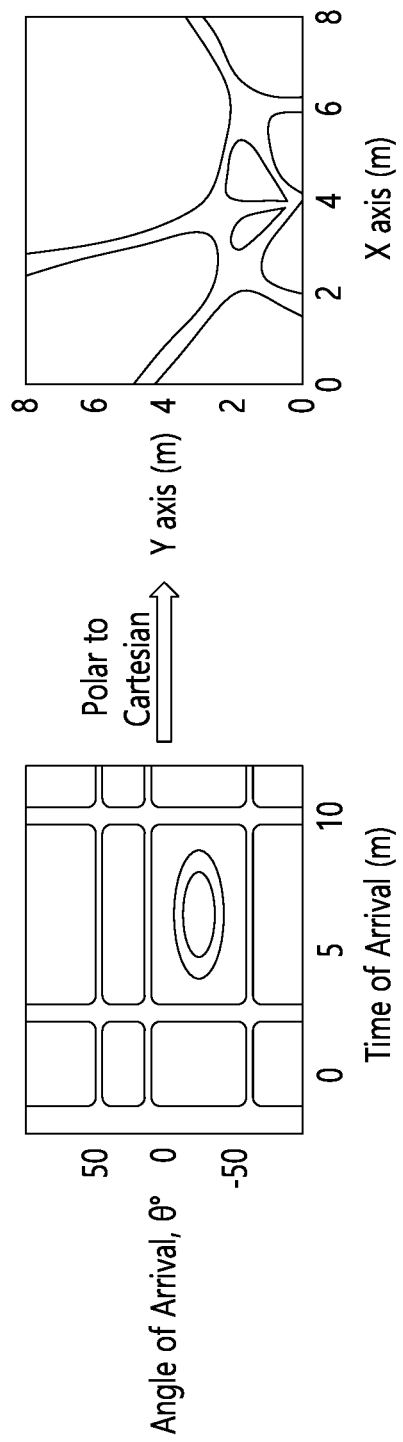
FIG. 5 shows indoor positioning using CSI-based WLAN sensing.

FIG. 5 shows indoor positioning using CSI-based WLAN sensing.

FIG. 5 shows that CSI-based wireless LAN sensing is used for indoor positioning. The sensing device may obtain indoor positioning information by obtaining an angle of arrival and a time of arrival by using the CSI and converting these into orthogonal coordinates.

Figure 6:
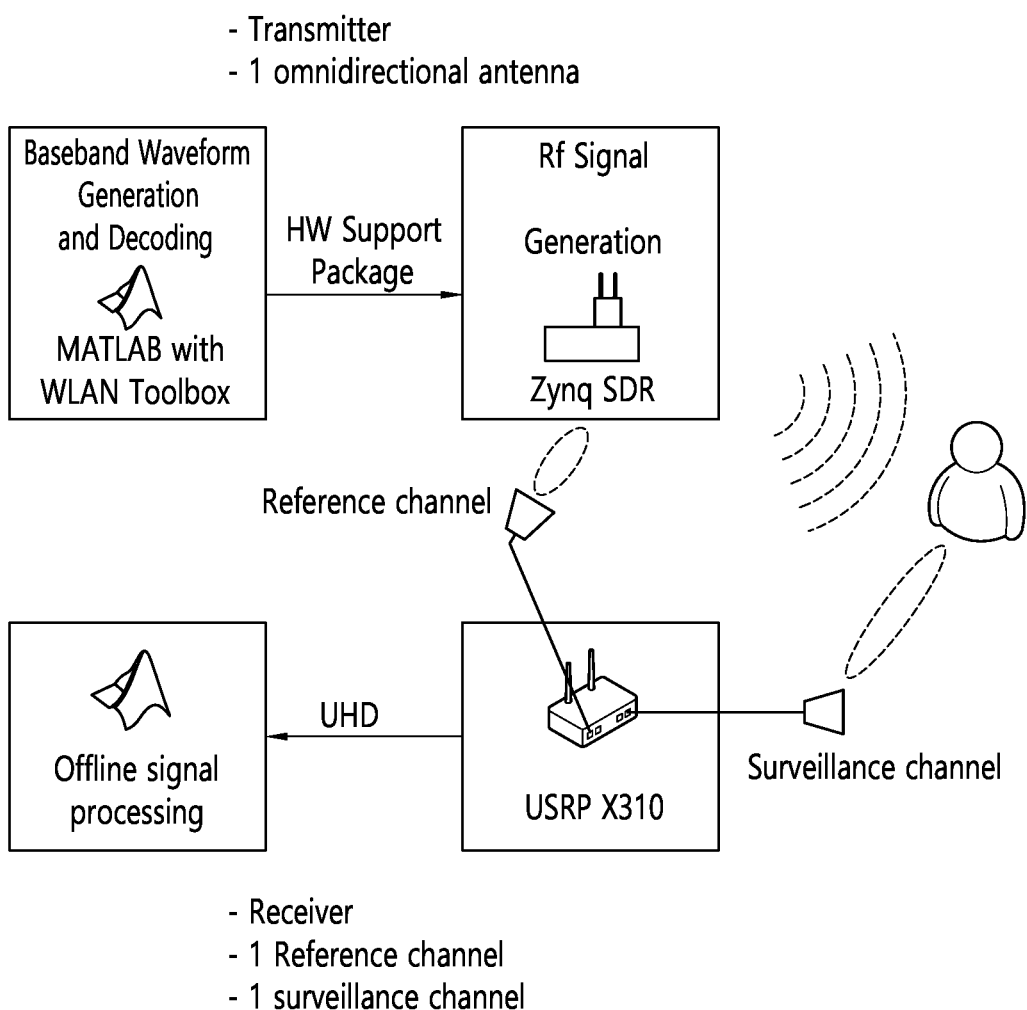
FIG. 6 is an example of an implementation of a wireless LAN sensing device.

FIG. 6 is an example of an implementation of a wireless LAN sensing device.

FIG. 6 is an implementation of a wireless LAN sensing device using MATLAB Toolbox, Zynq, and USRP. An IEEE 802.11ax wireless LAN signal is generated in the MATLAB toolbox, and an RF signal is generated using Zynq Software Defined Radio (SDR). The signal passing through the channel is received by USRP SDR and the sensing signal processing is performed in the MATLAB toolbox. Here, one reference channel (a channel that can be directly received from a sensing transmitter) and one surveillance channel (a channel that can be received by being reflected by an object)

are assumed. As a result of analysis using a wireless LAN sensing device, a unique characteristic that can distinguish movement or body movement was obtained.

Currently, IEEE 802.11bf wireless LAN sensing standardization is in the initial development stage, and cooperative sensing technology to improve sensing accuracy will be treated as important in the future. It is expected that the synchronization technology of sensing signals for cooperative sensing, CSI management and use technology, sensing parameter negotiation and sharing technology, and scheduling technology for CSI generation will be the key topics for standardization. In addition, long-distance sensing technology, low-power sensing technology, sensing security and privacy protection technology will also be considered as major agenda items.

IEEE 802.11bf wireless LAN sensing is a kind of radar technology that uses a wireless LAN signal that is commonly present anytime, anywhere. The table below shows typical IEEE 802.11bf use cases, which can be used in a wide range of real-life situations, such as indoor sensing, motion recognition, health care, 3D vision, and in-vehicle sensing. Because it is mainly used indoors, the operating range is usually within 10 to 20 meters, and the distance accuracy does not exceed 2 meters at most.

TABLE 2

| Name | details | Max range (m) | Key Performance Indicator | Range Accuracy (m) | Max Velocity (m/s)/ Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/ gesture detection | 10 | Gesture Detection | <1 | | |
| Gesture recognition - short range (finger movement) | Identification of a gesture from a set of gestures - range < 0.5 m | 0.5 | Gesture Detection | | 7 | 3 |
| Gesture recognition - medium range (hand movement) | Indentification of a gesture from a set of gestures - range > 0.5 m | 2 | Gesture Detection | | | |
| Gesture recognition - large range (full body movement) | Indentification of a gesture from a set of gestures - range > 2 m | 7 | Gesture Detection | 0.2 | 2/0.1 | 5 |

TABLE 2-continued

| Name | details | Max range (m) | Key Performance Indicator | Range Accuracy (m) | Max Velocity (m/s)/ Velocity Accuracy | angular Accuracy (deg) |
|---|---|---|---|---|---|---|
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/ Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

In IEEE 802.11, a technology for sensing the motion or gesture of an object (person or thing) using a wi-fi signal of 60 GHz (e.g., 802.11ad or 802.11ay signal) is being discussed. In this specification, a method for configuring a frame format used for wi-fi sensing and a wi-fi sensing sequence are proposed.

Figure 7:
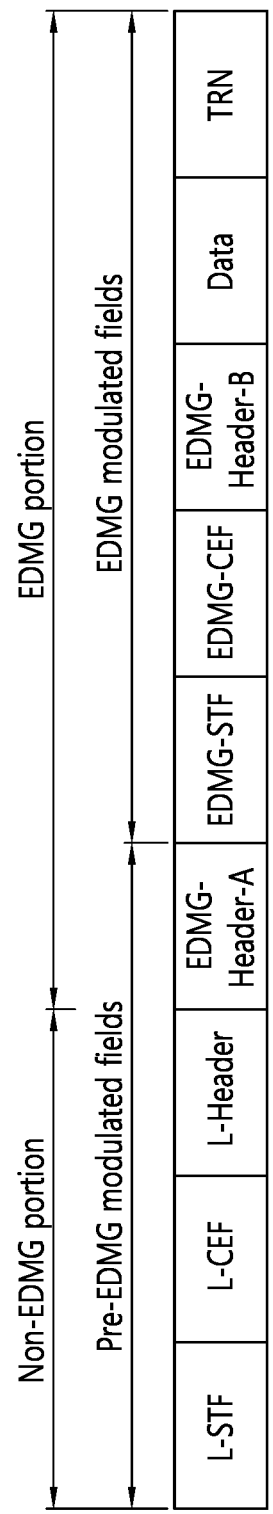
FIG. 7 is a diagram briefly illustrating a PPDU structure supported by an 802.11ay wireless LAN system.

FIG. 7 is a diagram briefly illustrating a PPDU structure supported by an 802.11ay wireless LAN system.

As shown in FIG. 7, the PPDU format applicable to the 802.11ay system may include L-STF, L-CEF, L-Header, EDMG-Header-A, EDMG-STF, EDMG-CEF, EDMG-Header-B, Data, and TRN fields. The fields may be selectively included according to the type of PPDU (e.g., SU PPDU, MU PPDU, etc.).

Here, a portion including the L-STF, L-CEF, and L-Header fields may be referred to as a non-EDMG portion, and the remaining portion may be referred to as an EDMG portion. In addition, the L-STF, L-CEF, L-Header, and EDMG-Header-A fields may be named pre-EDMG modulated fields, and the remaining parts may be named EDMG modulated fields.

The EDMG-Header-A field includes information required to demodulate an EDMG PPDU. The definition of the EDMG-Header-A field is the same as that of the EDMG SC mode PPDU and the EDMG OFDM mode PPDU, but is different from the definition of the EDMG control mode PPDU.

The structure of the EDMG-STF depends on the number of consecutive 2.16 GHz channels through which the EDMG PPDU is transmitted and the index $i_{STS}$ of the $i_{STS}$-th space-time stream. For single space-time stream EDMG PPDU transmission using EDMG SC mode through one 2.16 GHz channel, the EDMG-STF field does not exist. For EDMG SC transmission, the EDMG-STF field should be modulated using pi/(2-BPSK).

The structure of the EDMG-CEF depends on the number of consecutive 2.16 GHz channels through which the EDMG PPDU is transmitted and the number of space-time stream $i_{STS}$s. For single space-time stream EDMG PPDU transmission using EDMG SC mode through one 2.16 GHz channel, the EDMG-CEF field does not exist. For EDMG SC transmission, the EDMG-CEF field should be modulated using pi/(2-BPSK).

The (legacy) preamble part of the PPDU as described above can be used in packet detection, automatic gain control (AGC), frequency offset estimation, synchronization, modulation (SC or OFDM) indication and channel estimation. The format of the preamble may be common for OFDM packet and SC packet. In this case, the preamble may include a Short Training Field (STF) and a Channel Estimation (CE) field located after the STF field.

In 11SENS, a signal transmission/reception method of 802.11ad and 802.11ay, which is a 60 GHz Wi-Fi technology, is being considered in order to sense a motion or gesture of an STA or a person using a 60 GHz Wi-Fi signal. In this specification, for efficient Wi-Fi sensing, a method for configuring a sensing frame for channel estimation between an AP and an STA or an STA and an STA, and a sensing sequence for transmitting and receiving a sensing frame are proposed.

FIG. 8 shows an example of a sensing frame format.

The Wi-Fi sensing signal may be transmitted/received for channel estimation between the AP/STA and the STA using a wi-fi signal of 60 GHz. At this time, the sensing frame includes a non-EDMG preamble portion (i.e., L-STF, L-CEF, L-Header) in order to support backward capability with 802.11ad and 802.11ay, which are the existing 60 GHz Wi-Fi signals. Therefore, it can be configured in a frame format as shown in FIG. 8.

As shown in FIG. 8, the sensing frame may be configured of L-STF, L-CEF, L-Header, EDMG-Header A, EDMG-STF, and EDMG-CEF.

That is, since the sensing frame performs sensing on an STA or object by estimating a change in a channel between P2P (Point to point) or P2MP (point to multipoint), unlike the existing EDMG frame, it can be configured without including a data field.

Since the EDMG frame can be transmitted using one or more channels (ie, various channel bandwidths) of the 60 GHz band, the sensing frame is composed of EDMG-STF and EDMG-CEF fields as shown in FIG. 8.

Using the EDMG-STF and EDMG-CEF fields, the STA/AP can accurately measure channel information in sensing transmission/reception bandwidth (BW).

The information on the BW used for the sensing can be transmitted through the EDMG-header A, and at this time, it can be transmitted using the following various BWs.

TABLE 3

| Index | BW |
| --- | --- |
| 1 | 2.16 GHz |
| 2 | 4.32 GHz |
| 3 | 6.48 GHz |
| 4 | 8.64 GHz |
| 5 | 2.16 + 2.16 GHz (non-contiguous) |
| 6 | 4.32 + 4.32 GHz (non-contiguous) |

Figure 9:
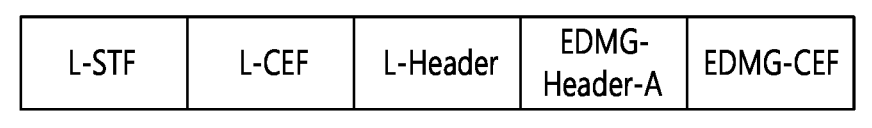

FIG. 9 shows another example of a sensing frame format.

Unlike the above, the sensing signal may be transmitted using only a fixed BW (eg, 2.16 GHz), and in this case, an additional AGC or the like is not required, so that the EDMG-STF can be omitted. Therefore, when sensing is performed using only a predetermined BW, the sensing frame format can be configured as shown in FIG. 9 by omitting the EDMG-STF. In addition, since only a set BW is used, the EDMG-header may not include the BW field unlike the existing ones during sensing.

FIG. 10 shows another example of a sensing frame format.

802.11ay transmission at 60 GHz basically transmits a signal using beamforming, and at this time, in order to set the optimal beam between Tx and Rx, AWV (antenna weight) for Tx antenna and Rx antenna using training (i.e., TRN) field vector) is set. Therefore, since the sensing frame transmits a signal using the previously determined AWV, it is difficult to accurately reflect the changed channel condition. Therefore, in order to more accurately measure the change in the channel, the sensing frame may include the TRN field as follows, and in this case, the information on the channel may be measured through the TRN field.

In FIG. 10, the sensing frame does not include a data field, and since channel measurement for sensing is performed using TRN, the EDMG-CEF field for channel estimation can be omitted. Therefore, the sensing frame format can be configured as shown in FIG. 11.

FIG. 11 shows another example of a sensing frame format.

Figure 12:
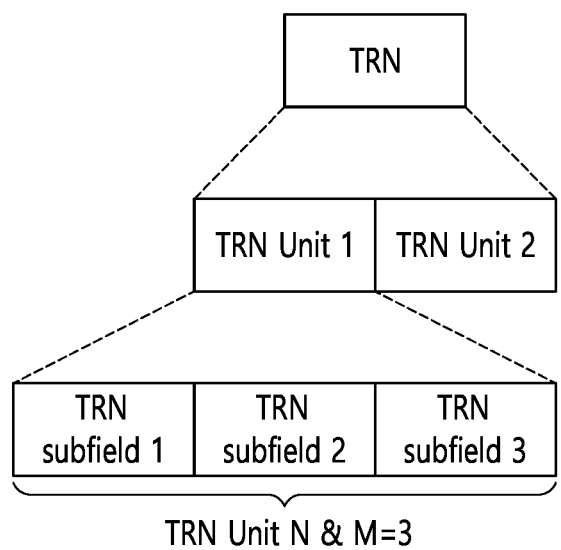
FIG. 12 shows an example of the configuration of the TRN field.

FIG. 12 shows an example of the configuration of the TRN field.

In the above, the TRN field for channel estimation does not support Beam Refinement Protocol (BRP)-Rx (only BRP-Tx is supported). In this case, the TRN subfield unit constituting the EDGM TRN unit may be configured as shown in FIG. 12.

In the above, the TRN field for channel estimation does not support Beam Refinement Protocol (BRP)-Rx (only BRP-Tx is supported). In this case, the TRN subfield unit constituting the EDGM TRN unit may be configured as shown in FIG. 12. Except when the DMG antenna used for PPDU transmission is changed at the beginning of the TRN field, the EDMG TRN-unit P indicates the number of TRN subfields requested at the start of the TRN-Unit using the same AWV as the AWV used for transmission of the preamble and data fields of the PPDU. If the value of EDMG TRN-unit P is 0, it indicates that there are 0 requested TRN subfields, and if the value of EDMG TRN-unit P is 1, it indicates that there is 1 requested TRN subfield, if the value of EDMG TRN-unit P is 2, it indicates two requested TRN subfields, and if the value of EDMG TRN-unit P is 3, it indicates that there are four requested TRN subfields.

A value obtained by adding 1 to the EDMG TRN-Unit M field indicates the number of TRN subfields requested in the TRN-Unit that can be used for transmission training. This field plus 1 is an integer multiple of the value displayed in the EDMG TRN-Unit N field.

The EDMG TRN-Unit N field indicates the number of consecutive TRN subfields requested in the EDMG TRN-Unit M transmitted using the same AWV. If the value of EDMG TRN-Unit N is 0, it represents one requested TRN subfield, if the value of EDMG TRN-Unit N is 1, it represents two requested TRN subfields, and if the value of EDMG TRN-Unit N is 2, when the EDMG TRN-Unit M field is 2, 5, 8, 11 or 14, it indicates three requested TRN subfields. If the value of EDMG TRN-Unit N is 2, if the EDMG TRN-Unit M field is 7 or 15, 8 requested TRN subfields are indicated, and if the value of EDMG TRN-Unit N is 3, it indicates 4 requested TRN subfields.

EDMG TRN-unit P is set to zero. Since there is no data field in the sensing frame, the EDMG TRN-unit P defining the section using the same AWV as the data field is set to 0.

EDGM TRN Unit N and EDMG TRN-unit M may be set to 2 or 3 respectively and transmitted.

The TRN unit constituting the TRN field may consist of 2 or a value of 2 or more.

Here, the above is only an example, and the TRN field may be configured through a different number of TRN units and TRN subfields.

The sensing frame configured as described above can be transmitted/received through the following sensing procedure or sensing sequence.

Figure 13:
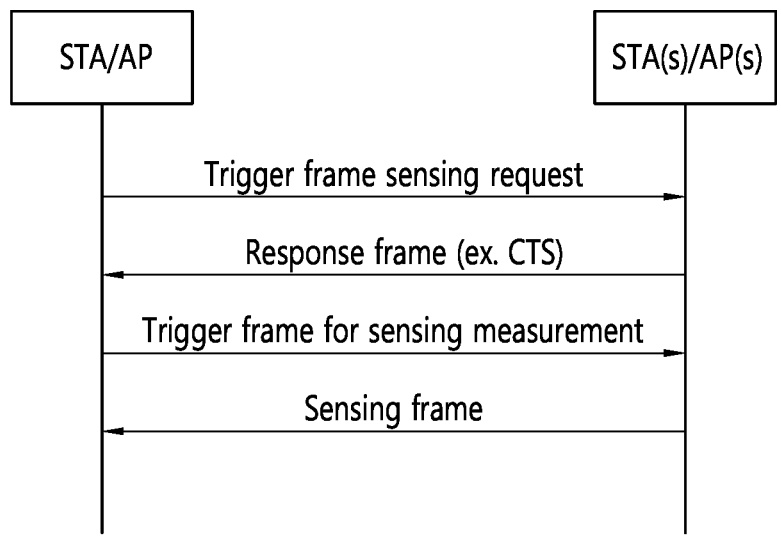
FIG. 13 shows an example of a sensing procedure using a trigger frame.

FIG. 13 shows an example of a sensing procedure using a trigger frame.

Figure 14:
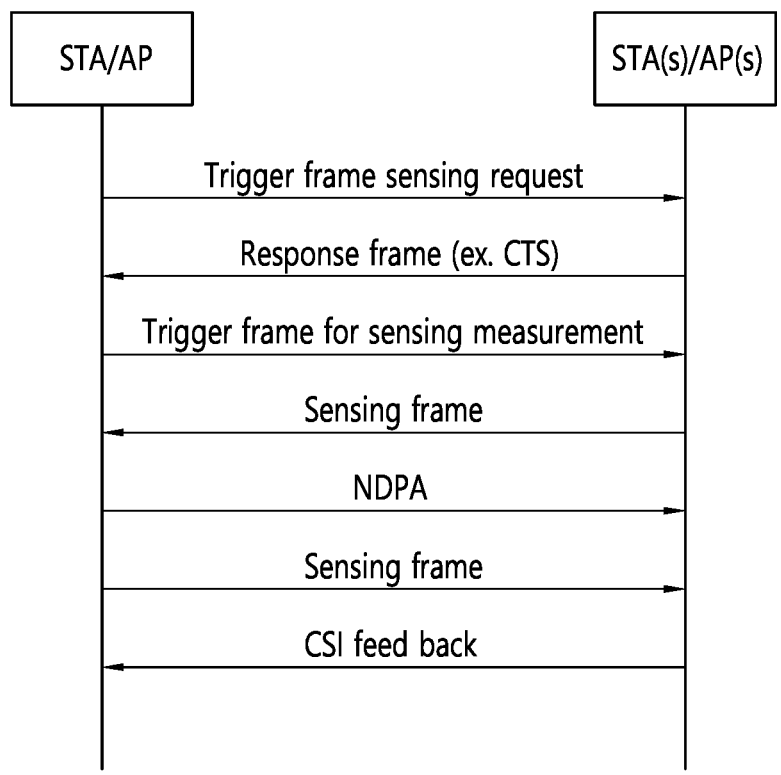
FIG. 14 shows another example of a sensing procedure using a trigger frame.

FIG. 14 shows another example of a sensing procedure using a trigger frame.

1. Trigger Based

A. In order to perform Wi-fi sensing, the STA/AP (sensing initiator) transmits a trigger frame. At this time, the trigger frame includes sensing request information (i.e., sensing request information).

i. The trigger frame supports P2P or P2MP.

B. The STA (sensing responder) that has received the sensing request through the trigger frame transmits the sensing participation through the response frame. In this case, as an example, whether to participate in sensing may be notified using a CTS (Clear To Send) frame (e.g., CTS to self or CTS to AP) as a response frame.

C. The sensing requesting STA that has identified the sensing participating STA through the response frame transmits a trigger frame and requests each STA (sensing participating STA) to transmit a sensing frame (a frame configured in the frame format proposed in FIGS. 8 to 11) for channel measurement.

D. Through the sensing frame received from the one or more STAs, the sensing request STA performs channel estimation and acquires sensing information by using changes in the amplitude and phase of the channel. (sensing procedure of FIG. 13)

E. In order to acquire more accurate sensing information in the sensing procedure of FIG. 13, the following process may be further performed after receiving the sensing frame. (sensing procedure of FIG. 14)

i. The sensing request STA/AP transmits a Null Data Packet Announcement (NDPA) to the STAs participating in sensing to inform the STAs participating in sensing that a sensing frame will be transmitted.

ii. Upon receiving this, the sensing participating STA receives the previously defined sensing frame from the sensing requesting STA/AP, estimates a channel based on the sensing frame, and measures CSI (channel state information) information. That is, since the sensing requesting STA and the sensing responding STA perform channel measurement based on the sensing frames received, respectively, channel changes of both the sensing requesting STA and the sensing responding STA can be used, and there is an effect that more accurate sensing information can be obtained.

iii. Each sensing participating STA that has measured CSI feeds back channel CSI information measured by it to the sensing requesting STA/AP. As another example, each sensing participating STA may feedback channel CSI information measured after receiving a feedback request frame from the sensing requesting STA/AP to the sensing requesting STA/AP.

F. The transmission/reception interval of the frames described in FIGS. 13 and 14 may be determined as a Short Inter Frame Space (SIFS), which is just one example and other IFSs may be used.

Figure 15:
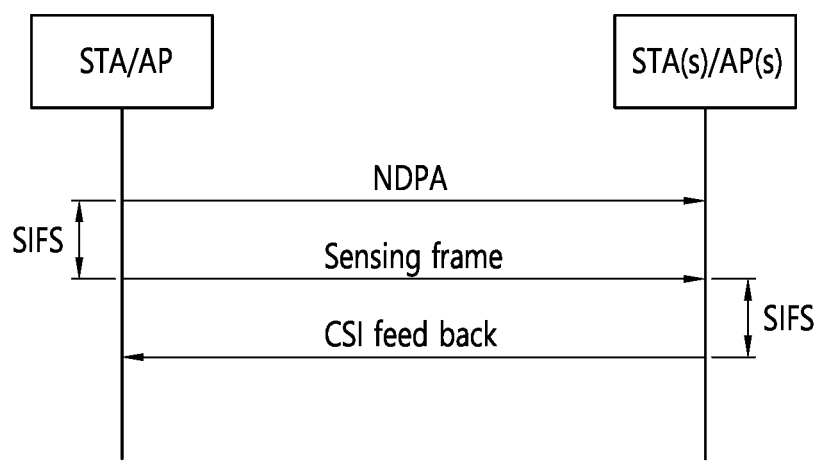
FIG. 15 shows an example of a sensing procedure that does not use a trigger frame.

FIG. 15 shows an example of a sensing procedure that does not use a trigger frame.

Figure 16:
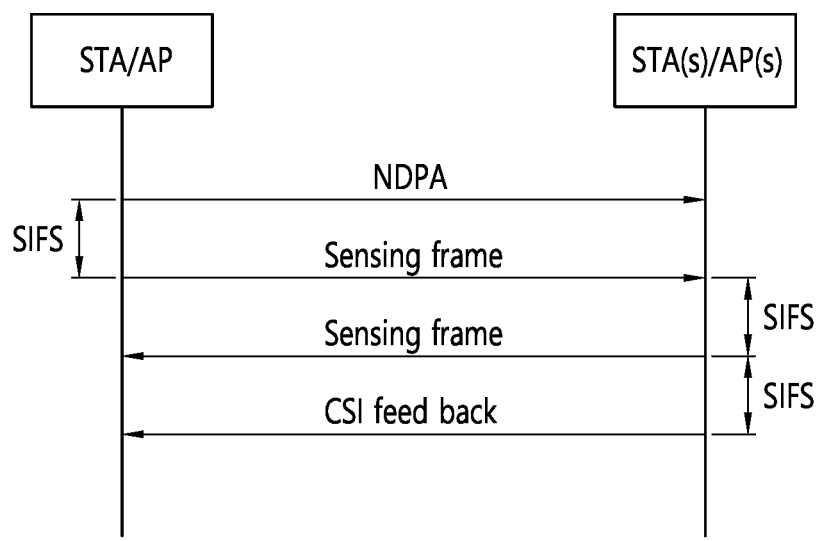
FIG. 16 shows another example of a sensing procedure that does not use a trigger frame.

FIG. 16 shows another example of a sensing procedure that does not use a trigger frame.

2. Non-Trigger Based

A. Case 1—single measurement case (sensing procedure of FIG. 15)

i. A sensing request STA/AP (sensing initiator) performing sensing transmits an NDPA to a sensing participating STA/AP (sensing responder).

ii. After NDPA transmission and SIFS, the sensing request STA/AP transmits a sensing frame.

iii. Upon receiving the sensing frame, the sensing participating STA/AP measures channel information (i.e., CSI) with the STA/AP by using the sensing frame.

iv. The sensing participating STA/AP feeds back the measured CSI information to the sensing requesting STA/AP after SIFS.

B. Case2—double measurement case (sensing procedure of FIG. 16)

i. The same operation is performed until ii. of the case 1.

ii. The sensing participating STA/AP (sensing responder) that has received the sensing frame from the sensing requesting STA/AP (sensing initiator) transmits a (other) sensing frame to the sensing requesting STA/AP.

1. The sensing request STA/AP measures and acquires channel information CSI information through the received sensing frame.

iii. The sensing request STA/AP measures channel information CSI by performing channel measurement using a sensing frame received from another (sensing participating) STA/AP.

iv. Upon receiving the sensing frame from the sensing requesting STA/AP, the sensing participating STA/AP feeds back the measured channel information (CSI) to the sensing requesting STA/AP after SIFS.

The STA/AP that performs sensing mentioned in this specification can be named sensing requestor, sensing initiator, sensing Tx, sensing owner, etc. An STA/AP participating in sensing may be named a sensing responder, sensing Rx, sensing measurement, etc. This is just one example and may be named differently.

Hereinafter, the above-described embodiment will be described with reference to FIGS. 1 to 16.

Figure 17:
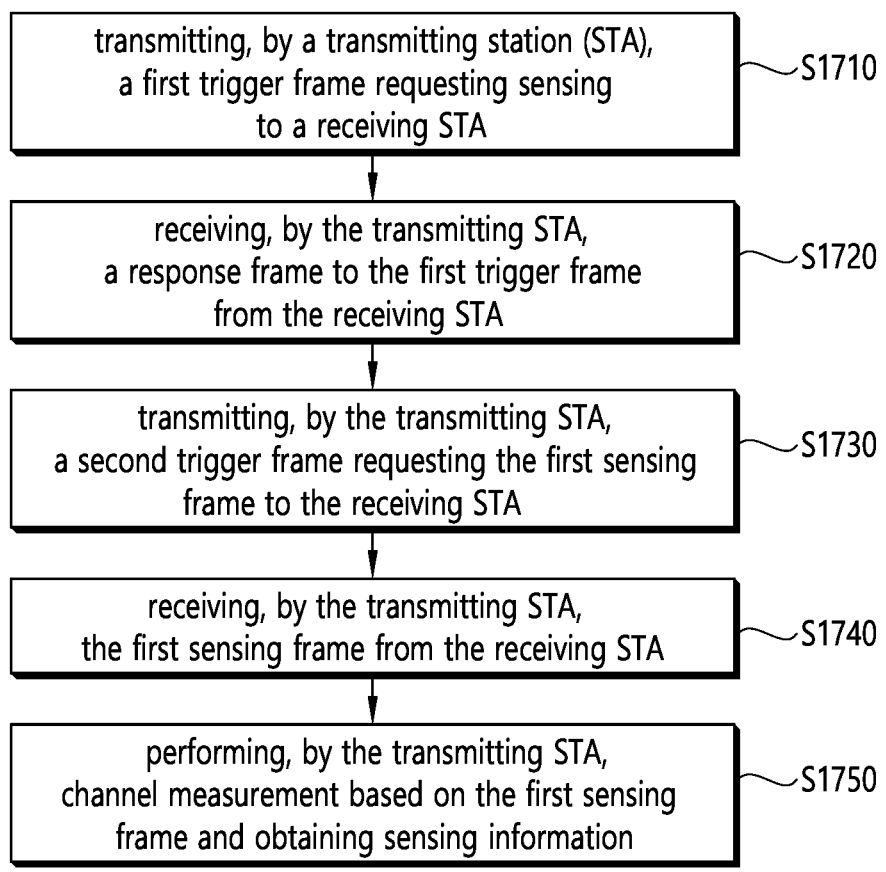
FIG. 17 is a flowchart illustrating a procedure in which a transmitting STA performs sensing according to the present embodiment.

FIG. 17 is a flowchart illustrating a procedure in which a transmitting STA performs sensing according to the present embodiment.

The example of FIG. 17 may be performed in a network environment in which a next-generation wireless LAN system (IEEE 802.11bf) is supported. The next-generation wireless LAN system is a wireless LAN system improved from 802.11ad and 802.11 ay systems, and may satisfy backward compatibility with 802.11ad and 802.11ay systems.

The example of FIG. 17 is performed by a transmitting STA, and the transmitting STA may correspond to a sensing initiator. The receiving STA of FIG. 17 may correspond to a sensing responder.

This embodiment proposes a sensing procedure for sensing a motion or gesture of an STA or an object using a wireless signal of a 60 GHz band. In particular, this embodiment proposes a method of configuring a sensing frame transmitted and received by the transmitting STA and the receiving STA.

In step S1710, a transmitting station (STA) transmits a first trigger frame requesting sensing to a receiving STA. The first trigger frame may support point to point (P2P) or point to multipoint (P2MP).

In step S1720, the transmitting STA receives a response frame to the first trigger frame from the receiving STA. The response frame may be a clear to send (CTS) frame.

In step S1730, the transmitting STA transmits a second trigger frame requesting the first sensing frame to the receiving STA.

In step S1740, the transmitting STA receives the first sensing frame from the receiving STA.

In step S1750, the transmitting STA performs channel measurement based on the first sensing frame and obtains sensing information. The transmitting STA may know a change in amplitude and phase of a channel by performing channel measurement based on the first sensing frame, and may acquire the sensing information through this.

In this case, the transmitting STA and the receiving STA transmit and receive a radio signal in a 60 GHz band. That is, it can be said that all of the above-described frames are radio signals transmitted and received in a 60 GHz band.

This embodiment proposes a trigger-based sensing procedure using a trigger frame (the first trigger frame). On the contrary, there is a case where the sensing procedure is performed by transmitting the NDPA without using a trigger frame.

However, in order to obtain more accurate sensing information, the transmitting STA and the receiving STA may additionally perform the following procedure.

The transmitting STA may transmit a Null Data Packet Announcement (NDPA) notifying the transmission of a second sensing frame to the receiving STA. The transmitting STA may transmit the second sensing frame to the receiving STA. The transmitting STA may receive a feedback frame from the receiving STA.

The feedback frame may be transmitted after receiving the feedback frame from the transmitting STA, and may include channel state information (CSI) measured based on the second sensing frame.

According to the added procedure, the transmitting STA performs channel measurement based on the first sensing frame, and the receiving STA performs channel measurement based on the second sensing frame. Since both the channel changes of the transmitting STA and the receiving STA are used, there is an effect that the sensing accuracy can be increased.

In the above procedure, the transmission/reception interval of each frame may be determined by SIFS.

As described above, the sensing frame used for sensing may be configured as follows.

The first and second sensing frames may include a non-EDMG (Enhanced Directional Multi Gigabit) part and an EDMG part. The non-EDMG part may include a Legacy-Short Training Field (L-STF), a Legacy-Channel Estimation Field (L-CEF), and an L-Header. The EDMG part includes an EDMG-Header-A field and does not include a data field. That is, since the first and second sensing frames are frames used for sensing an STA or an object, unlike the existing EDMG frame, they may be configured without including a data field.

The EDMG part may include an EDMG-STF, an EDMG-CEF, or a training (TRN) field. The EDMG-STF, the EDMG-CEF, and the TRN field may be used for channel measurement. When the first and second sensing frames are transmitted/received using only a fixed band, the EDMG-STF may be omitted because additional Automatic Gain Control (AGC) is not required. In addition, in order to more accurately measure the channel change, the TRN field may be included in the first and second sensing frames. In addition, if the TRN field is included in the first and second sensing frames, the EDMG-CEF used for channel estimation may be omitted.

The EDMG-Header-A field may include information on a bandwidth in which the first and second sensing frames are transmitted, information on EDMG TRN unit P, information on EDMG TRN unit N, and information on EDMG TRN unit M.

The bandwidth through which the first and second sensing frames are transmitted may be set to one of 2.16 GHz, 4.32 GHz, 6.48 GHz, 8.64 GHz, 2.16+2.16 GHz, or 4.32+4.32 GHz.

The EDMG TRN unit P may be set to 0. This is because the data field is not included in the first and second sensing frames. The EDMG TRN unit N may be set to 2 or 3, and the EDMG TRN unit M may be set to 2 or 3. The TRN field may consist of two or more TRN units. That is, the configuration of the TRN field may be determined through the information.

Figure 18:
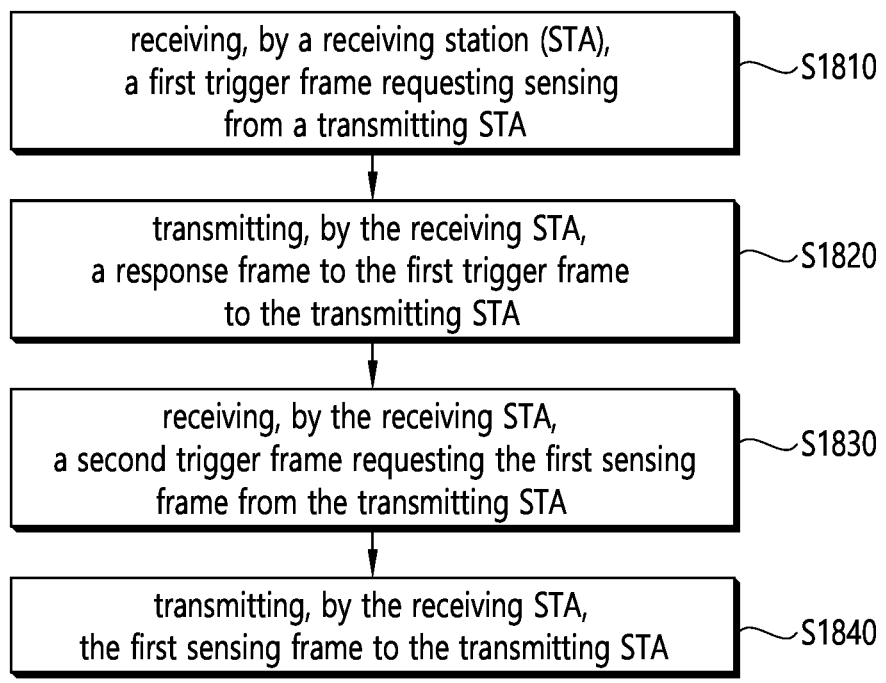
FIG. 18 is a flowchart illustrating a procedure in which a receiving STA performs sensing according to the present embodiment.

FIG. 18 is a flowchart illustrating a procedure in which a receiving STA performs sensing according to the present embodiment.

The example of FIG. 18 may be performed in a network environment in which a next-generation wireless LAN system (IEEE 802.11bf) is supported. The next-generation wireless LAN system is a wireless LAN system improved from 802.11ad and 802.1 lay systems, and may satisfy backward compatibility with 802.11ad and 802.11ay systems.

The example of FIG. 18 is performed by a receiving STA, and the receiving STA may correspond to a sensing responder. The transmitting STA of FIG. 18 may correspond to a sensing initiator.

This embodiment proposes a sensing procedure for sensing a motion or gesture of an STA or an object using a wireless signal of a 60 GHz band. In particular, this embodiment proposes a method of configuring a sensing frame transmitted and received by the transmitting STA and the receiving STA.

In step S1810, a receiving station (STA) receives a first trigger frame requesting sensing from a transmitting STA. The first trigger frame may support point to point (P2P) or point to multipoint (P2MP).

In step S1820, the receiving STA transmits a response frame to the first trigger frame to the transmitting STA. The response frame may be a clear to send (CTS) frame.

In step S1830, the receiving STA receives a second trigger frame requesting the first sensing frame from the transmitting STA.

In step S1840, the receiving STA transmits the first sensing frame to the transmitting STA. The transmitting STA may know a change in amplitude and phase of a channel by performing channel measurement based on the first sensing frame, and may acquire the sensing information through this.

In this case, the transmitting STA and the receiving STA transmit and receive a radio signal in a 60 GHz band. That is, it can be said that all of the above-described frames are radio signals transmitted and received in a 60 GHz band.

This embodiment proposes a trigger-based sensing procedure using a trigger frame (the first trigger frame). On the contrary, there is a case where the sensing procedure is performed by transmitting the NDPA without using a trigger frame.

However, in order to obtain more accurate sensing information, the transmitting STA and the receiving STA may additionally perform the following procedure.

The receiving STA may receive a Null Data Packet Announcement (NDPA) notifying the transmission of the second sensing frame from the transmitting STA. The receiving STA may receive the second sensing frame from the transmitting STA. The receiving STA may transmit a feedback frame to the transmitting STA.

The feedback frame may be transmitted after receiving the feedback frame from the transmitting STA, and may include channel state information (CSI) measured based on the second sensing frame.

According to the added procedure, the transmitting STA performs channel measurement based on the first sensing frame, and the receiving STA performs channel measurement based on the second sensing frame. Since both the channel changes of the transmitting STA and the receiving STA are used, there is an effect that the sensing accuracy can be increased.

In the above procedure, the transmission/reception interval of each frame may be determined by SIFS.

As described above, the sensing frame used for sensing may be configured as follows.

The first and second sensing frames may include a non-EDMG (Enhanced Directional Multi Gigabit) part and an EDMG part. The non-EDMG part may include a Legacy-Short Training Field (L-STF), a Legacy-Channel Estimation Field (L-CEF), and an L-Header. The EDMG part includes an EDMG-Header-A field and does not include a data field. That is, since the first and second sensing frames are frames used for sensing an STA or an object, unlike the existing EDMG frame, they may be configured without including a data field.

The EDMG part may include an EDMG-STF, an EDMG-CEF, or a training (TRN) field. The EDMG-STF, the EDMG-CEF, and the TRN field may be used for channel measurement. When the first and second sensing frames are transmitted/received using only a fixed band, the EDMG-STF may be omitted because additional Automatic Gain Control (AGC) is not required. In addition, in order to more accurately measure the channel change, the TRN field may be included in the first and second sensing frames. In addition, if the TRN field is included in the first and second sensing frames, the EDMG-CEF used for channel estimation may be omitted.

The EDMG-Header-A field may include information on a bandwidth in which the first and second sensing frames are transmitted, information on EDMG TRN unit P, information on EDMG TRN unit N, and information on EDMG TRN unit M.

The bandwidth through which the first and second sensing frames are transmitted may be set to one of 2.16 GHz, 4.32 GHz, 6.48 GHz, 8.64 GHz, 2.16+2.16 GHz, or 4.32+4.32 GHz.

The EDMG TRN unit P may be set to 0. This is because the data field is not included in the first and second sensing frames. The EDMG TRN unit N may be set to 2 or 3, and the EDMG TRN unit M may be set to 2 or 3. The TRN field may consist of two or more TRN units. That is, the configuration of the TRN field may be determined through the information.

The technical features of the present disclosure may be applied to various devices and methods. For example, the technical features of the present disclosure may be performed/supported through the device(s) of FIG. 1 and/or FIG. 6. For example, the technical features of the present disclosure may be applied to only part of FIG. 1 and/or FIG. 6. For example, the device according to the present disclosure transmits a first trigger frame requesting sensing to a receiving station (STA); receives a response frame to the first trigger frame from the receiving STA; transmits a second trigger frame requesting the first sensing frame to the receiving STA; receives the first sensing frame from the receiving STA; and performs channel measurement based on the first sensing frame and obtains sensing information.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including transmitting a first trigger frame requesting sensing to a receiving station (STA); receiving a response frame to the first trigger frame from the receiving STA; transmitting a second trigger frame requesting the first sensing frame to the receiving STA; receiving the first sensing frame from the receiving STA; and performing channel measurement based on the first sensing frame and obtaining sensing information. The instructions stored in the CRM of the present specification may be executed by at least one processor. The CRM in the present specification may be a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    transmitting, by a transmitting station (STA), a first trigger frame requesting sensing to a receiving STA;
    receiving, by the transmitting STA, a response frame to the first trigger frame from the receiving STA;
    transmitting, by the transmitting STA, a second trigger frame requesting the first sensing frame to the receiving STA;
    receiving, by the transmitting STA, the first sensing frame from the receiving STA; and
    performing, by the transmitting STA, channel measurement based on the first sensing frame and obtaining sensing information,
    wherein the transmitting STA and the receiving STA transmit and receive a radio signal in a 60 GHz band.

2. The method of claim 1, further comprising:
    transmitting, by the transmitting STA, a Null Data Packet Announcement (NDPA) notifying the transmission of a second sensing frame to the receiving STA;
    transmitting, by the transmitting STA, the second sensing frame to the receiving STA; and
    receiving, by the transmitting STA, a feedback frame from the receiving STA,
    wherein the feedback frame is transmitted after the receiving STA receives a feedback request frame from the transmitting STA,
    wherein the feedback frame includes channel state information (CSI) measured based on the second sensing frame.

3. The method of claim 2,
    wherein the first and second sensing frames include a non-EDMG (Enhanced Directional Multi Gigabit) part and an EDMG part,
    wherein the non-EDMG part includes a Legacy-Short Training Field (L-STF), a Legacy-Channel Estimation Field (L-CEF), and an L-Header,
    wherein the EDMG part includes an EDMG-Header-A field and does not include a data field.

4. The method of claim 3,
    wherein the EDMG part includes an EDMG-STF, an EDMG-CEF or a training (TRN) field,
    wherein the EDMG-STF, the EDMG-CEF and the TRN fields are used for channel measurement.

5. The method of claim 4, wherein the EDMG-Header-A field includes information on a bandwidth in which the first and second sensing frames are transmitted, information on EDMG TRN unit P, information on EDMG TRN unit N, and information on EDMG TRN unit M.

6. The method of claim 5,
    wherein the bandwidth through which the first and second sensing frames are transmitted is set to one of 2.16 GHz, 4.32 GHz, 6.48 GHZ, 8.64 GHz, 2.16+2.16 GHz, or 4.32+4.32 GHz,
    wherein the EDMG TRN unit P is set to 0,
    wherein the EDMG TRN unit N is set to 2 or 3, and
    wherein the EDMG TRN unit M is set to 2 or 3.

7. The method of claim 6, wherein the TRN field consists of two or more TRN units.

8. The method of claim 1,
    wherein the transmitting STA is a sensing initiator,
    wherein the receiving STA is a sensing responder,
    wherein the first trigger frame supports point to point (P2P) or point to multipoint (P2MP),
    wherein the response frame is a clear to send (CTS) frame.

9. A transmitting station (STA) in a wireless local area network (WLAN) system, the transmitting STA comprising:
    a memory;
    a transceiver; and
    a processor being operatively connected to the memory and the transceiver,
    wherein the processor is configured to:
    transmit a first trigger frame requesting sensing to a receiving STA;

receive a response frame to the first trigger frame from the receiving STA;
transmit a second trigger frame requesting the first sensing frame to the receiving STA;
receive the first sensing frame from the receiving STA; and
perform channel measurement based on the first sensing frame and obtaining sensing information,
wherein the transmitting STA and the receiving STA transmit and receive a radio signal in a 60 GHz band.

10. A method in a wireless local area network (WLAN) system, the method comprising:
receiving, by a receiving station (STA), a first trigger frame requesting sensing from a transmitting STA;
transmitting, by the receiving STA, a response frame to the first trigger frame to the transmitting STA;
receiving, by the receiving STA, a second trigger frame requesting the first sensing frame from the transmitting STA; and
transmitting, by the receiving STA, the first sensing frame to the transmitting STA,
wherein the transmitting STA and the receiving STA transmit and receive a radio signal in a 60 GHz band.

11. The method of claim 10, further comprising:
receiving, by the receiving STA, a Null Data Packet Announcement (NDPA) notifying the transmission of the second sensing frame from the transmitting STA;
receiving, by the receiving STA, the second sensing frame from the transmitting STA; and
transmitting, by the receiving STA, a feedback frame to the transmitting STA,
wherein the feedback frame is transmitted after the receiving STA receives a feedback request frame from the transmitting STA,
wherein the feedback frame includes channel state information (CSI) measured based on the second sensing frame.

12. The method of claim 11,
wherein the first and second sensing frames include a non-EDMG (Enhanced Directional Multi Gigabit) part and an EDMG part,
wherein the non-EDMG part includes a Legacy-Short Training Field (L-STF), a Legacy-Channel Estimation Field (L-CEF), and an L-Header,
wherein the EDMG part includes an EDMG-Header-A field and does not include a data field.

13. The method of claim 12,
wherein the EDMG part includes an EDMG-STF, an EDMG-CEF or a training (TRN) field,
wherein the EDMG-STF, the EDMG-CEF and the TRN fields are used for channel measurement.

14. The method of claim 13, wherein the EDMG-Header-A field includes information on a bandwidth in which the first and second sensing frames are transmitted, information on EDMG TRN unit P, information on EDMG TRN unit N, and information on EDMG TRN unit M.

15. The method of claim 14,
wherein the bandwidth through which the first and second sensing frames are transmitted is set to one of 2.16 GHz, 4.32 GHz, 6.48 GHz, 8.64 GHz, 2.16+2.16 GHz, or 4.32+4.32 GHZ,
wherein the EDMG TRN unit P is set to 0,
wherein the EDMG TRN unit N is set to 2 or 3, and
wherein the EDMG TRN unit M is set to 2 or 3.

* * * * *